United States Patent Office 3,378,819
Patented Apr. 16, 1968

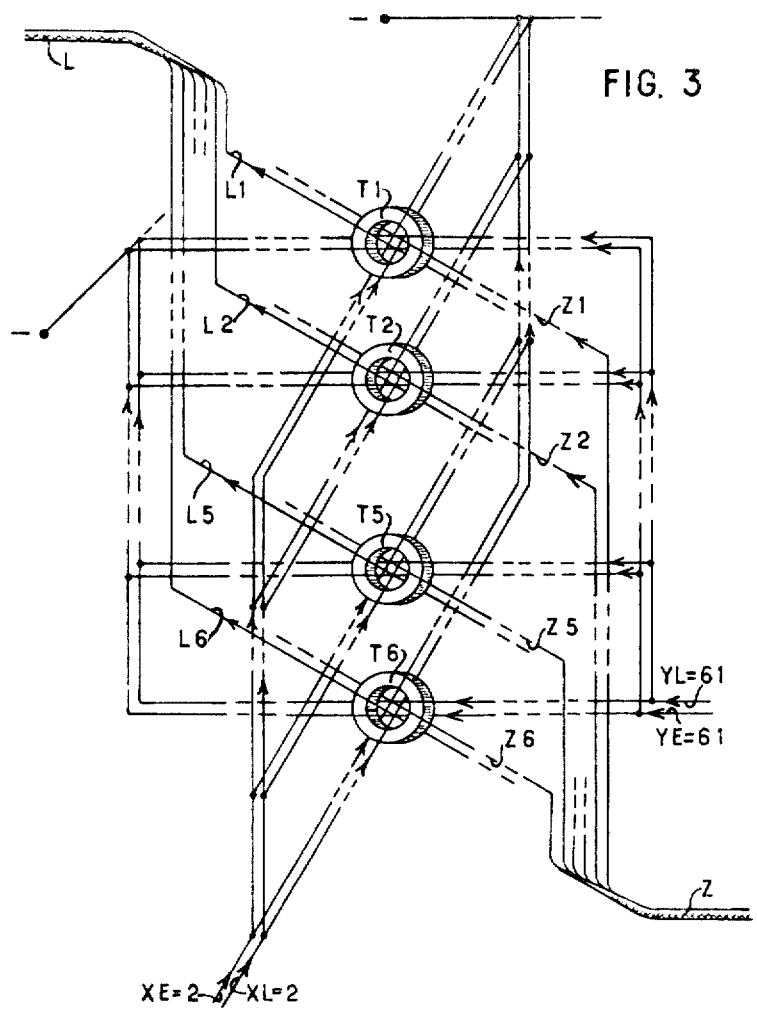

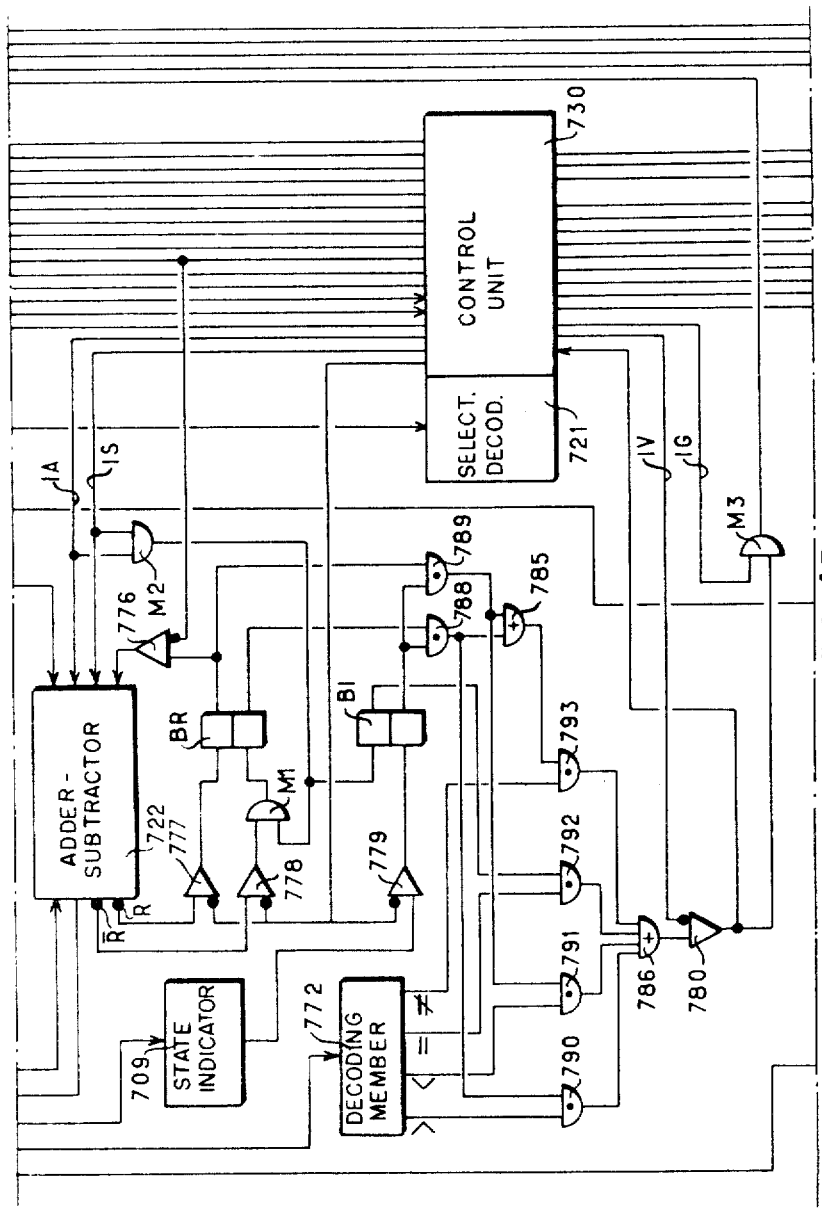

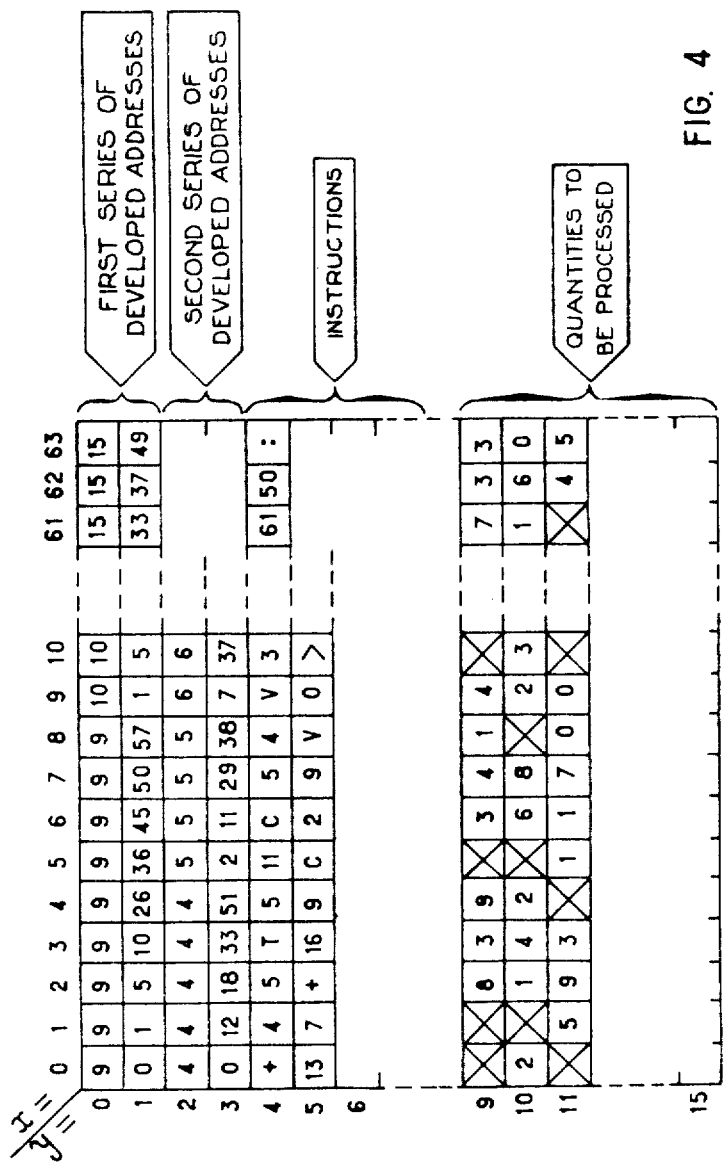

3,378,819
DATA PROCESSING SYSTEM WITH
INDIRECT ADDRESSING
Jacques Georges Lucien Hannicq, Bagnolet, and Maurice
Guillaume Jean Burel, Courbevoie, France, assignors
to Societé Industrielle Bull-General Electric (Societé
Anonyme), Paris, France
Filed Mar. 8, 1965, Ser. No. 437,714
Claims priority, application France, Mar. 17, 1964,
967,652, Patent 1,404,464
4 Claims. (Cl. 340—172.5)

ABSTRACT OF THE DISCLOSURE

In a data processor, a storage system, organized on a character-bias, contains addresses, instructions and operands in specialized storage sections. Besides In-Out registers, selection registers, address registers, instruction registers and address incrementing means, there is provided a constant register which can be connected, under control of a control unit, to one of the two stages of the selection register for adjoining an ordinate or Y part of an address to the abscissa or X part of said address stored in the other stage of the selection register, in order to constitute a direct address of two characters, whereby an instruction, including an Operation code and two indirect addresses for A and B operands, is comprised of only three characters.

---

The present invention relates to a system for storing and processing data which is arranged to permit selection of data contained in a store, from addresses comprising a small number of characters and known as reduced addresses or "indexes."

System for storing and processing data thus arranged, such as that described in United States patent application Ser. No. 297,745, filed July 24, 1963, for "Wire Symbolic Addressing Systems," now U.S. Patent 3,293,617, have the object of selecting and extracting, by known methods, quantities to be processed which are contained in a store, by means of indexes forming part of instructions recorded in this store. The said store is then designed to contain three different categories of data, the data of the first category consisting of instructions, the data of the second category consisting of direct addresses called developed addresses and the data of the third category consisting of quantities to be processed. These systems are arranged to enable an index contained in an instruction which has been extracted from the store to monitor the selection and extraction of a corresponding developed address contained in the store, the said developed address in turn renering possible the monitoring of the selection and extraction of a quantity to be processed which is contained in the store. This index thus performs the function of an indirect address. These systems are particularly advantageous by virtue of the fact that each index consists of a very limited number of characters and that it consequently requires only a relatively small amount of space to be stored in the store. In the electronic computer art, this method of addressing the store, in which indexes are employed, is sometimes known as symbolic addressing.

In data-processing machines employing conventional addressing systems and operating under the control of a programme recorded in a store, it is frequently found that there are present in the addresses forming part of the instructions of the programme pluralities of identical addresses which occupy considerable space in the store. In data-processing machines employing so-called symbolic addressing systems, on the other hand, the space occupied in the machine by a developed address and the plurality of identical indexes corresponding to this developed address is substantially smaller, so that it is possible, owing to the saving of space which is effected, to use for recording the programme a store of smaller capacity, while retaining the same possibilities of utilisation. It has been found that one and the same index is on average used only two or three times in the course of one and the same programme. It may thus be shown that in practice the advantage of a wired symbolic addressing system is fully effective only if the number of characters constituting an index is at most equal to half the number of characters constituting a developed address. For example, in cases where the store comprises 100,000 locations, each location serving to record a character, the selection of the data contained in the locations of this store takes place under the control of addresses comprised between 00,000 and 99,999. Each address 00,000, 00,001, 00,002, 00,003, . . . 99,999 consists of five decimal digits in the case under consideration. In consequence of what has been stated in the foregoing, a symbolic addressing system can be advantageously utilised by a machine comprising store having 100,000 locations only if the number of characters constituting each index is at most equal to two. Likewise in cases where the capacity of the store is 1000 locations, each developed address consists of three decimal digits and it is then neccessary for each index to consist of one character in order that the use of a symbolic addressing system may prove advantageous.

In order to permit maximum utilisation of the possibilities of the store, it is common practice in data-processing machines to store the data in the store in the form of words, each word consisting of any number of characters and being recorded at the rate of one character per store location. However, since the words thus stored have not all the same number of characters, it is essential for the beginning and the end of each word to be readily identifiable. For this purpose, various modes of identification have been proposed. In a first mode of identification, it has been proposed to store the words one after the other in the store, the beginning of each word being identified by a "word mark" allocated to the first character of this word. In another mode of identification, it has been proposed to store the words one after the other in zones bounded by special characters called "flag" characters, each zone then comprising a number of successive locations. Any one of the words contained in the store may be designated by either of these methods, by simply specifying by means of a single address, depending upon the mode of identification adopted, either the first character of this word, the said character which is situated at the beginning of the zone containing this word. By successively modifying the said address by one unit, it is then possible to select successively each of the characters of this word until the succeeding word has been revealed.

It will be appreciated from all these considerations that a zone comprising a number of locations may thus be selected by means of a single address and that, in the majority of problems to be dealt with, it is then necessary to utilize as many different developed addresses as there are zones involved in these problems. In wired symbolic addressing systems, since correspondence may be established between an index and a developed address by wiring, it is therefore necessary to use as many different indexes as there are zones involved in a problem to be dealt with.

In addition, it is found particularly advantageous to adopt for each of the characters constituting an index the same mode of representation as for the other characters contained in the store. In the mode of representation generally adopted, it will be considered that each of the characters constituting an index is represented, in coded form, by a combination of six binary digits. With the mode of representation thus adopted, it is possible to form 64 different binary combinations and it is then possible to represent in coded form 64 different characters by conventionally allocating each of these combinations to the coded expression of each of these characters.

In cases where the capacity of the store is large and more particularly between 10,000 and 100,000 characters, each index consists of a maximum of two characters, as has previously been indicated. Owing to the fact that each of these characters is represented by a combination of six binary digits, it is possible to form up to 4096 different combinations and thus to have available 4096 different indexes. In the majority of problems to be dealt with, this number of indexes is ample, it having been found that in the majority of problems dealt with only a fraction of the capacity of the store, on average of the order of one-third, is effectively utilized by the words which can be used in the processing, the remaining two-thirds serving in fact for recording the developed addresses and the instructions of the programme. It follows that, in the case of the store capacity under consideration, the total number of characters forming the words which can be dealt with rarely exceeds 30,000. If it is assumed that a word is formed on average of seven to eight characters, it will then be seen that the maximum number of zones utilized, and consequently the number of different indexes necessary for selecting these zones, rarely exceeds 4000.

In cases where the capacity of the store is small and is below 1000 characters, each index consists of one character, for the reasons set out in the foregoing. Since this character is represented by a combination of six binary digits, the number of different combinations which can be formed is reduced to 64. Consequently, only 64 different indexes will be available. This number is still sufficient, since the total number of characters forming the words capable of being dealt with is then of the order of 300, which corresponds to about fifty zones.

However, when equipment requires the use of a store of medium capacity, for example between 1024 and 4096 characters, this procedure affords only very minor advantages, because in this case each developed address consists of four characters, and consequently each index cannot consist of more than two characters. If it is then decided to form each index of one character, 64 different indexes may be available, but this number of indexes is found insufficient because the total number of characters of the words capable of being dealt with varies between about 340 and 1350, depending upon the capacity of the store. It is known that it is then necessary to have available a number of different indexes between about 40 and 170, which obviously is possible only if each index consists of two characters. When each index consists of two characters, 4096 different indexes can then be made available, which by far exceeds all the possibilities of use. However, the use of indexes consisting of two characters proves insufficient, because the material means then involved to enable this utilization are relatively costly and the expenditure thus incurred is out of proportion with the store capacities under consideration.

The present invention has for its object to obviate these disadvantages by providing a data storage and processing system by means of which it is possible to select and extract data contained in a store in accordance with a wired symbolic addressing mode, this system being more particularly advantageous when it is employed with stores of medium capacity, for example having a capacity between 1024 and 4096 characters. Moreover, the data which can be selected and extracted in accordance with the invention by this mode of addressing comprise not only quantities or operands to be processed but also instructions. The possibility of selecting and extracting an instruction from an index greatly facilitates the task of the programmer in the preparation of the programme and in particular relieves him of the necessity to concern himself with the actual location of the instructions in the store.

A store of medium capacity utilizing the system according to the invention is characterized in that it must be arranged to be able to store characters, each character (letter, decimal digit or sundry sign) being represented in its coded form by a combination of six binary digits.

One of the objects of the present invention is concerned more particularly, in a data-processing machine, with a system for storing and processing data which comprises a direct-access store provided with means for selecting storage locations, the said store containing, in a determined part, programme instructions which may be selected and extracted under the control of an address emanating from a first address register, called the programme address register, and transmitted to the aforesaid selecting means, each instruction comprising a character indicating an operation to be performed and at least one reduced indirect address consisting of a single character and called an index, the said store containing in addition, in another part, addresses called developed addresses which comprise two characters and may be selected and extracted from the said indexes, and then extracted from the store in order to permit of thereafter selecting and extracting quantities to be processed which are contained in a further part of the store, an operation-indicating character of a selected instruction being automatically transmitted to a decoding device for selecting, in a control unit, a programme progress control chain for performing the operation determined by the said operation-indicating character, the said system being characterised in that it comprises a constant register intended to contain at least one constant consisting of a character, and a selection register, having a capacity of two characters, which is connected on the one hand to the store in order to receive an index of an instruction extracted from the store, and on the other hand to the constant register to receive later a constant under the control of the control unit, the said index and the said constant being thereafter transmitted from the selection register to the selection means of the store in order to select a developed address, the said developed address thereafter being extracted from the store, transmitted to the selection register, and then to the selection means of the store for selecting a quantity to be processed.

Another object of the invention is concerned with a system for storing and processing data in which the store contains instructions of a first type and of a second type, a first series and a second series of developed addresses, the developed addresses of the first series serving to select quantities to be processed which are contained in the store, the developed addresses of the second series serving to select instructions of any type, the developed addresses of the first series being selectively extracted from the store by means of indexes forming part of the instructions of the first type, and the developed addresses of the second series being selectively extracted from the store by means of indexes forming part of the instructions of the second type.

Further features and advantages of the invention will become apparent in the course of the following description, with reference to the accompanying drawings, which show by way of example the principle of the invention and a preferred mode of application of this principle.

The described example has no limiting character and may be adapted to means designed for the purpose of its application.

In the drawings:

FIGURE 1A diagrammatically illustrates a first part of a data-processing machine comprising a system for storing and processing data according to the invention;

FIGURE 1B diagrammatically illustrates a second part of this machine;

FIGURE 1C diagrammatically illustrates a third part of this machine;

FIGURE 1 illustrates the mode of assembly of FIG-

URES 1A, 1B and 1C to form a general diagrammatic view of the machine;

FIGURE 3 is a circuit diagram intended to show the arrangement of the storage elements of a direct-access store and the manner in which they are utilised for the selective recording or extraction of data;

FIGURE 4 illustrates an example of the distribution of data in a direct-access store forming part of a system for storing and processing data according to the invention.

In FIGURES 1A, 1B, 1C and 2, the semi-circles with a "+" sign inside them represent logical "OR" circuits, the semi-circles with a dot inside them represent logical "AND" circuits, the semi-circles containing no signs represent "mixer" circuits, and the triangles represent control circuits. These circuits, which are of known type, are similar to those described and illustrated notably in patent application Ser. No. 297,345, filed July 24, 1963, for "Wired Symbolic Addressing System," now U.S. Patent No. 3,293,617, and Ser. No. 404,322, filed Oct. 16, 1964, for "Collating Machine for Selecting and Collating Cards, now U.S. Patent No. 3,276,767. It will be recalled that each mixer circuit performs no particular logical function and that its object is to enable positive pulses which arrive through different inputs to be transmitted to an output, so as to prevent an impulse which arrives through one of these inputs from reacting in turn on the other inputs. It will also be recalled that each control circuit possesses two inputs, of which one, called the pulse input, is marked with a dot to distinguish it from the other. This circuit supplies a positive output pulse only if the said other input, called the control input, previously receives a positive voltage of a certain duration. The output pulse is produced by the application of a short positive pulse to the pulse input.

Figure 1A:
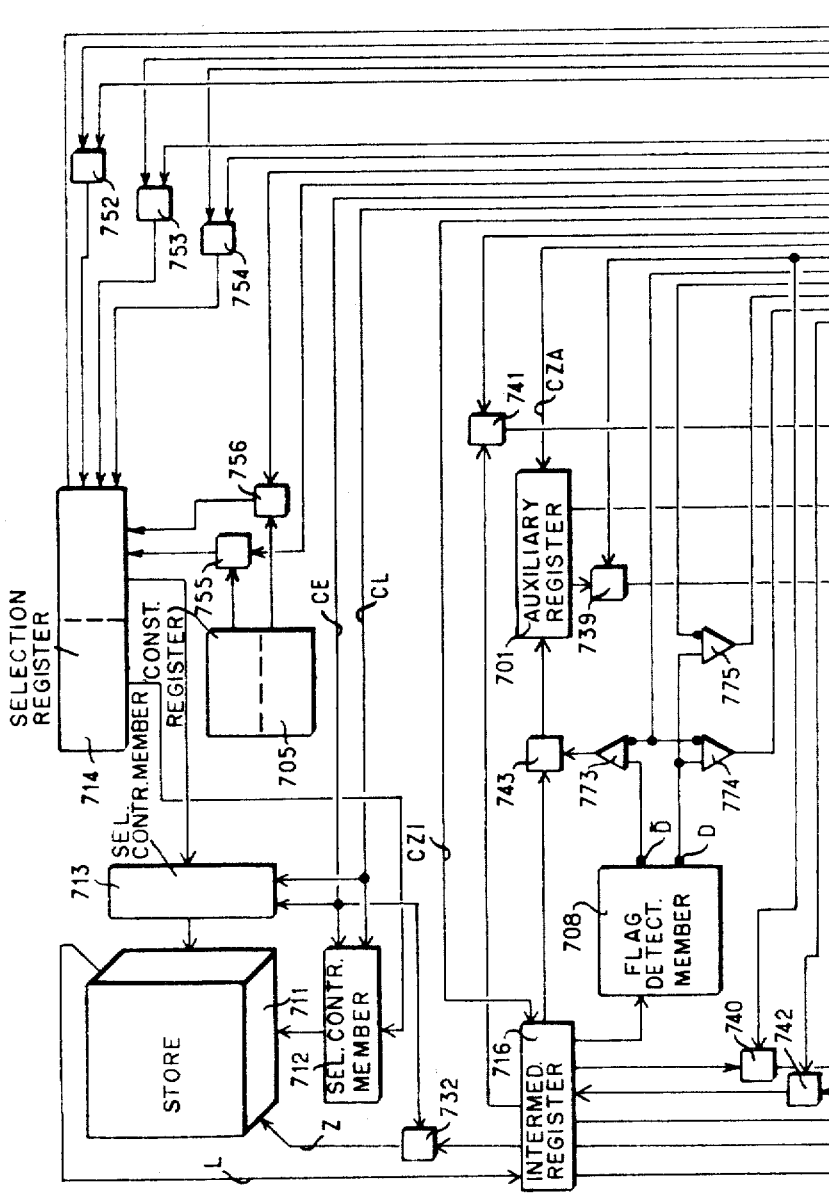
Figure 1C:
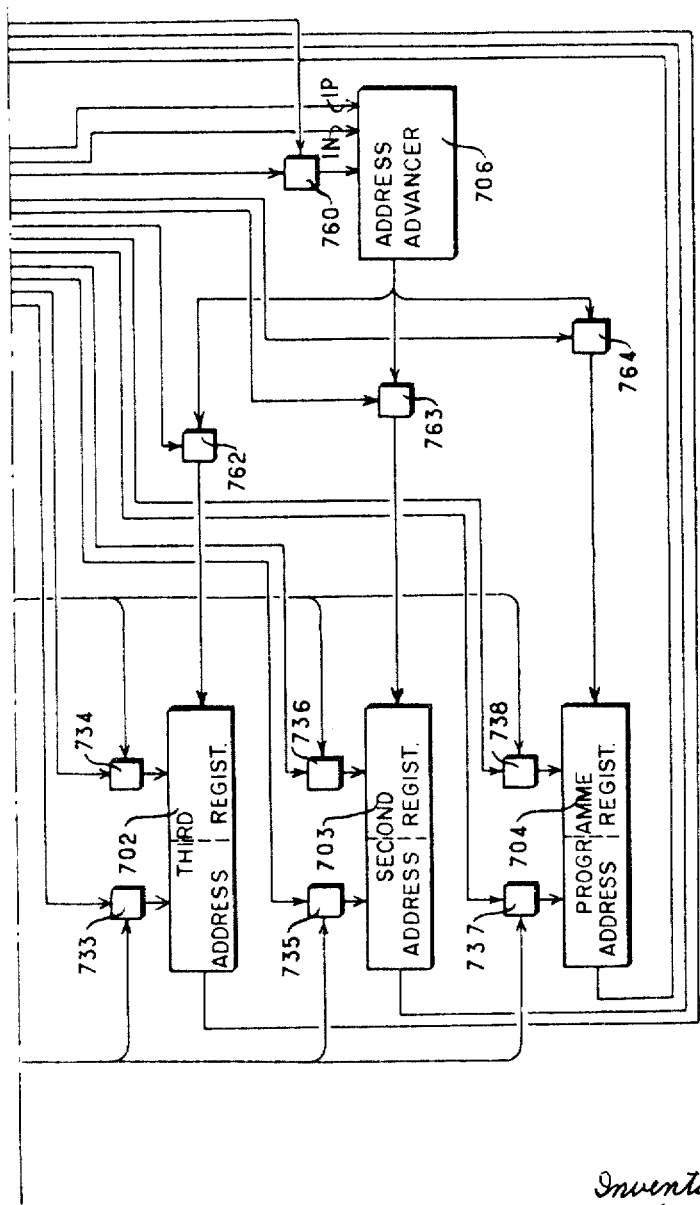

In the drawings accompanying the present description, FIGURES 1A, 1B and 1C, assembled as indicated in FIGURE 1, illustrate a data-processing machine arranged to permit the selection of quantities to be processed which are stored in a store, the selection taking place in accordance with a particularly advantageous cabled symbolic addressing mode, the capacity of the said store remaining between 1024 and 4096 characters. In FIGURES 1A, 1B and 1C assembled in this way, there will be seen a store 711 in which there are stored data consisting of the instructions of a stored programme, of the developed addresses and of the quantities to be processed. The selection and extraction of the data contained in this store take place by means of storage location selecting means called selection control members, 712 and 713, and connected to the said store. The data extracted are transmitted to an intermediate register 716 and stored therein. These selection control members are rendered operative by control pulses transmitted from a control unit 730 by means of conductors CL and CE, while the selection is effected in known manner under the control of an address contained in a selection register 714 connected to the selection control members 712 and 713 as indicated in FIGURE 1A.

Figure 2:
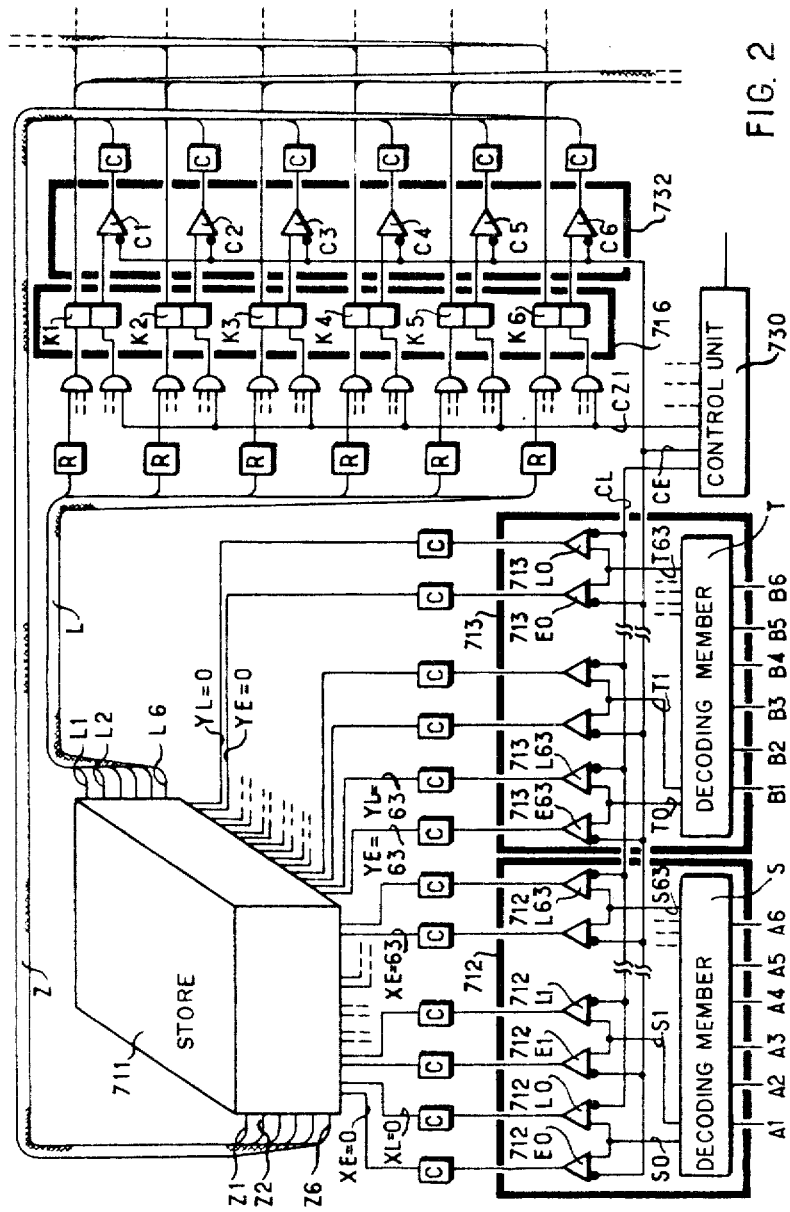
FIGURE 2 illustrates in greater detail a number of devices employed in the machine illustrated in FIGURES 1A, 1B and 1C.

FIGURE 2 shows in greater detail the constitution of these devices and their interconnections. Referring now to FIGURE 2, it will be assumed that the store 711 is a store comprising magnetic cores, but it is to be understood that the adoption of this type of store is not necessary for the purpose of the invention and that it may be replaced by any other type of store comprising a matrix of storage elements. It will be assumed that in the type of store illustrated in FIGURE 2 the magnetic cores are distributed on various core levels, so as to form columns and rows on each level. The code adopted for the coded representation of the characters is a code having six binary positions, which is sometimes known as the 32–16–8–4–2–1 code. With such a code, each character is represented by a coded combination of six binary digits, the storage of which in the store necessitates a set of six cores disposed one above the other in different planes. The combination of these six cores constitutes a store location. The number of locations of the store is optional a priori, but it is to be noted that, for a particularly advantageous application of the invention, this number should be between 1024 and 4096. The locations of the store 711 are grouped in accordance with a system of coordinates in such manner that the locations 0 to 63 of a first row are defined by the coordinates $y=0$, $x=0, 1, 2, \ldots, 62, 63$. Likewise the locations 64 to 127 are defined by the coordinates $y=1$, $x=0, 1, 2, 3, \ldots, 62, 63$. It is to be noted here that there corresponds to each value of $y$ a row of 64 cores and that the value of $y$ may optionally be limited to 15 in the case where the number of locations of the store is 1024.

Finally, it may be assumed that, in the case where the capacity of the store is 1024 characters, the store consists of six levels of magnetic cores, each level comprising 1024 cores disposed in 16 rows and 64 columns. In this case, the selection of the locations is effected by the choice of coordinates $x$ and $y$, $x$ being capable of taking the values $0, 1, 2, 3, \ldots, 63$, and $y$ being capable of taking the values $0, 1, 2, 3, \ldots, 15$. In the case where the capacity of the store is 4096 characters, each store level comprises 4096 cores disposed in 64 columns and 64 rows.

FIGURE 3 is intended to illustrate the manner in which the cores are arranged to form the locations of the store. FIGURE 3 shows by way of example the first two cores T1 and T2 and the second two cores T5 and T6, among the six cores T1 to T6 which constitute one of the 4096 locations of a store of 4096 characters. In the example under consideration, the store location thus represented is defined by the coordinates $x=2$, $y=61$. It will be appreciated from FIGURE 3 that the store operates in a well known manner in accordance with the principle of coincidence. For this purpose, each core has six conductors extending therethrough. In each of the six levels of the store, two of these conductors, called writing conductors, serve, when fed with current through conductors $XE=2$, $YE=61$, to bring each of the cores of the aforesaid location into a state of magnetisation called the state "1." Each of the six cores, however, may be selectively maintained in its initial state of magnetisation, or state "0," by means of one of the conductors Z1, Z2, ..., Z6 permitting the passage of a current whose effect is opposed to those of the currents flowing through the writing conductors. In each of the six levels, two other conductors, called reading conductors, serve, when fed with current through conductors $XL=2$, $YL=61$, to return to the state "0" those of the cores of the location which have been brought into the state "1" in a preceding operation. The return of a core from the state "1" to the state "0" gives rise to a current induced in one of the six conductors L1, L2, . . . L6, which extends through this core.

Without further entering into the details of the construction of the store, it will simply be indicated that there are associated with each of the abscissae $x$ a conductor XE and a conductor XL, that there are associated with each of the ordinates $y$ a conductor YE and a conductor YL, so that a set of 64 conductors $XE=0, 1, 2, 3, \ldots, 63$ and of 64 conductors $YE=0, 1, 2, 3, \ldots, 63$ permits of selecting a location in the registration of a character in the store, and that a set of 64 conductors $XL=0, 1, 2, 3, \ldots, 63$ and of 64 conductors $YL=0, 1, 2, 3, \ldots, 63$ permits of selecting a location in the extraction of a character from the store. It will also be recalled that the conductors Z1 and L1 all extend through the cores of the level 1, that the conductors Z2 and L2 all extend through the cores of the level 2, and so on. It is known that, in the registration of a character, the conductors Z1, Z2, . . ., Z6 are selectively energised, so that if the state of energisation of a conductor conventionally represents the binary digit "1" and if its state of non-energisation represents the binary digit "0," these six conductors permit of representing a binary combination corresponding to the encoding of the character to be stored. It is also known that, in the extraction of a character, the conductors L1, L2, ... L6 are selectively traversed by an induced current, depending upon whether the cores selected have or have not changed their state of magnetisation, so that these conductors represent a binary combination corresponding to the encoding of the extracted character.

Adverting to FIGURE 2, it will be noted that the 64 conductors $XE=0, 1, 2, 3, ..., 63$ the 64 conductors $XL=0, 1, 2, 3, ..., 63$, the 64 conductors $YE=0, 1, 2, 3, ..., 63$ and the 64 conductors $YL=0, 1, 2, 3, ..., 63$ (only some of which have been shown with the obvious object of simplification) are connected to calibrating members of known type, which are represented in FIGURE 2 by rectangles within which the letter C has been placed. The object of the calibrating members is to adjust the strength of the currents flowing through them, so that the strength of the current supplied by each of them is set at a value equal to half the value necessary for changing the magnetic state of a core. The calibrating members are in addition connected to the control output circuits 712E0 to 712E63, 712L0 to 712L63, 713E0 to 71E63, 713L0 to 713L63.

FIGURE 2 shows that each of the control circuits 712E0 to 712E63 is connected to each of the conductors $XE=0$ to $XE=63$ respectively, that each of the control circuits 712L0 to 712L63 is connected to each of the conductors $XL=0$ to $XL=63$ respectively, that each of the control circuit 712E0 to 712E63 is connected to each of the conductors $YE=0$ to $YE=63$, respectively, and that each of the control circuits 713L0 to 713L63 is connected to each of the conductors $YL=0$ to $YL=63$, respectively, all these connections being established by means of the calibrating members.

It is important to note that, depending upon the capacity of the store under consideration, the number of control circuits 713E0 to 713E63 and 713L0 to 713L63 may be reduced, owing to the reduction of the number of conductors YE and YL. FIGURE 2 also shows a decoding member S of known type, possessing six inputs A1, A2, ... A6 and 64 outputs S0, S1, ..., S63, by means of which one of its inputs can be brought to a positive potential, depending upon the state of conductors connected to its input, the said conductors representing by their state a binary combination corresponding to the coding of a character. The output S0 is connected to the group consisting of the control circuits 712E0 and 712L0, the output S1 is connected to the group consisting of the control circuits 712E1 and 712L1, and so on. In this way, depending upon the binary combination formed at the inputs A1, A2, ..., A6, a single input is brought to a positive potential, whereby the group of control circuits connected to the said output is rendered conductive. A second decoding member T comprising six inputs B1, B2, ... B6 similiarly makes it possible to render conductive one of the groups of control circuits 713E0 and 713L0, 713E1 and 713L1, and so on.

FIGURE 2 further shows that the control unit 730 is connected through the conductor CE to the pulse inputs of the control circuits 712E0 to 712E63 and 713E0 to 713E63, and that it is connected through the conductor CL to the pulse inputs of the control circuits 712L0 to 712L63 and 713L0 to 713L63. FIGURE 2 also shows that the intermediate register 716 consists of six flip-flops K1 to K6 having two stable states, of known type, by means of which the six binary digits representing a coded character can be stored. It will be recalled that each flip-flop comprises one so-called "normal" input one so-called "complementary" input, one "normal" output and one "complementary" output. In the present case, each of the "complementary" outputs is connected to one of the control inputs of six control circuits C1 to C6. The assembly formed of these control circuits constitutes a member called a control member or gate 732. Each of these control circuits has the object of transmitting a positive pulse supplied by the control unit 730 only in the case where the "complementary" output of the flip-flop which is connected thereto is brought to a positive potential, or, what amounts to the same thing, each time the state of this flip-flop convenionally represents the binary digit "0." This positive pulse to be transmitted is sent through the conductor CE which, as is shown by FIGURE 2, is divided into two branches, one leading to the control circuits 712E0 to 712E63 and 713E0 to 713E63, and the other leading to the control circuits C1 to C6. The pulses transmitted by the control circuits C1 to C6 are calibrated in amplitude by means of calibrating members and then serve to energise the conductors Z1 to Z6 of the store. In this way, a character held in the intermediate register 716 may be stored in the store 711 in a location defined as a function of the decoding effected by the decoding members S and T. This storage is effected without the state of the flip-flops K1 to K6 being changed. Consequently, it is necessary for the intermediate register to be returned to zero before performing any character extraction from the store. This return to zero is effected by a simple pulse sent by the control unit 730 through a conductor CZI, to the "complementary" inputs of the flip-flops K1 to K6.

Without any further reference to the arrangement and utilisation of the store, it will be indicated that, during the extraction of a character from the store, the pulses produced by the change of the cores from the state "1" to the state "0" are sent through the conductors L1 to L6 to regenerating members which are represented in FIGURE 2 by rectangles within which the letter R is situated. The function of the regenerating members is to vary the amplitude of the pulses which reach them in such manner that these pulses can serve for the correct positioning of the flip-flops K1 to K6. For the sake of simplicity, it will be pointed out that the six conductors Z1 to Z6 have been represented in some parts of FIGURE 2 by a single connecting conductor Z, but this mode of representation will not introduce any confusion since the references for the members have been so chosen that the connections made can be found. For example, the conductor Z1 is connected to the calibrating member which is connected to the control circuit C1, the conductor Z2 is connected to the calibrating member which is connected to the control circuit C2, and so on. Similarly, the six conductors L1 to L6 have been represented by a single connecting conductor L in some parts of the figure.

Referring again now to FIGURES 1A, 1B and 1C, it will be noted that the intermediate register 716 whose capacity is one character has been connected not only to the store 711 by the aforesaid connections, but also to other members, so that transfers of characters can take place between the intermediate register and these members. Thus, a character contained in the intermediate register may be transmitted, inter alia, to an auxiliary register 701 through a gate 743, or to a decoding device called the selector decoder 721, by way of a gate 741, or else to an adder-subtractor device 722 through a gate 749. FIGURE 1A also shows that the intermediate register is connected to a "flag" detecting member 708, the function of which is to detect the presence of "flag" characters in the intermediate register. This "flag" detector is a decoding member which, depending upon the result of the decoding effected, brings one of its two outputs D and $\overline{D}$ to a positive voltage. When the combination of six binary digits recorded in the intermediate register represents a "flag" character, only the output D is brought to a positive potential, which renders conductive two control circuits 774 and 775, the control input of which is connected to the said output D. When, on the other hand, the combination recorded in the intermediate register represents a character other than a "flag" character, or again when the said register contains no character, only the output D̄ is brought to a positive potential, whereby a control circuit 773 is rendered conductive, the control input of which is connected to the said output D̄. When the control circuit 773 is thus rendered conductive and a pulse then sent by the control unit 730 reaches the pulse input of the said control circuit, this circuit 773 supplies a pulse to the gate 743, whereby the transfer of the character contained in the intermediate register to the auxiliary register 701 is initiated. If the intermediate register contains successively the digits of one or other of two operands A and B, it is desirable to detect the end of the digits which constitute each of these two operands. In this case, each time the intermediate register is likely to contain one of the digits of the operand A, a pulse is sent to the control circuit 775 by the control unit, while, each time the intermediate register is likely to contain one of the digits of the operand B, a pulse is sent to the circuits 773 and 774 by the control unit. The pulses which are transmitted by the circuits 774 and 775 are sent to the control unit. Thus, the circuit 774 transmits a pulse to the control unit when the intermediate register contains a "flag" which marks the end of the operand B. Likewise, the circuit 775 transmits a pulse to the control unit when the intermediate register contains a "flag" which marks the end of the operand A.

It is to be noted that the construction of the auxiliary register is similar to that of the intermediate register and that its capacity is one character. Consequently, the auxiliary register consists of six flip-flops and the gate 743 consists of six control circuits. The control input of each of the control circuits is connected to the "normal" output of a corresponding flip-flop of the intermediate register, while the output of each of these circuits is connected to the "normal" input of a corresponding flip-flop of the auxiliary register. The return-to-zero of the auxiliary register is effected by simultaneous application of a pulse to the "complementary" inputs of the flip-flops which constitute it. This pulse is sent by the control unit 730 through a conductor CZA.

FIGURES 1A and 1B show that a decoding member 772 called the decoder of the intermediate register 716 is connected to the intermediate register 716 to identify the presence, in this register, of special characters, such as the symbols $>$, $<$, $=$ and $\neq$. The construction of the decoder 772, which is similar to that of the "flag" detector, is now well known and for this reason will not be described. It will merely be indicated that the decoder 772 possesses four outputs marked by the symbols $>$, $<$, $=$ and $\neq$, and that when one of the aforesaid special characters is contained in the intermediate register 716, one of the four outputs, which is marked by the same symbol as that contained in the register 716, is brought to a positive potential.

FIGURES 1A and 1B also show that a member 709 called the state indicator of the intermediate register is connected to the said intermediate register. This state indicator 709, the construction of which is known in the electronic computer art, has the object of detecting the presence or absence of a character in the intermediate register. The said indicator 709 possesses a single output connected to the control input of a control circuit 779. Each time the intermediate register contains a character or a digit different from zero, the output of the state indicator 709 is brought to a positive potential, whereby the control circuit 779 is rendered conductive.

The auxiliary register 701 is connected to the adder-subtractor device 722, through a gate 739, the function of which is to permit the transfer, to the adder-subtractor, of a digit contained in the auxiliary register. It will be indicated that each of the gates 739 and 740 consists of six control circuits. When these gates simultaneously receive a pulse emanating from the control unit 730, the two digits to be added (or subtracted) which are contained in the auxiliary register and in the intermediate register respectively, are simultaneously transmitted to the adder-subtractor. The adder-subtractor 722 is not of special construction and it is of known form, so as to perform an adding (or subtracting) operation on two decimal digits coded on the binary system. The subtraction which is effected by the said adder-subtractor consists in deducting from the digit initially contained in the intermediate register the digit initially contained in the auxiliary register. The digit which expresses the result of this operation is transmitted to the intermediate register 716 through a gate 742, while any carry of this operation is transmitted to a carry flip-flop BR. It is to be noted that the gate 742 consists of twelve control circuits by means of which the result can thus be transferred to the register 716 in true form and in complementary form. It is thereby made unnecessary to return the intermediate register to zero before the result is transferred thereto. The "normal" input of the flip-flop BR is connected to the output of a control circuit 777, while its "complementary" input is connected through a mixer circuit M1 to the output of a control circuit 778. In the case where a carry appears after an operation, one output R of the adder-subtractor is brought to a positive potential, whereby the control circuit 777 whose control input is connected to this output R is rendered conductive. In this case, the control circuit 777 is non-conductive. Consequently, a pulse coming from the pulse generator 730 and simultaneously applied to the pulse inputs of the circuits 777 and 778 is transmitted only by the circuit 777 and positions the flip-flop BR at "1." On the other hand, if no carry is produced as a result of an operation, an output R̄ of the adder-subtractor is brought to a positive potential, whereby the circuit 778 connected by its control input to this output R̄ is rendered conductive. The circuit 777 is then rendered non-conductive, so that a pulse emanating from the control unit 730 and applied simultaneously to the pulse inputs of the circuits 777 and 778 is transmitted only by the circuit 778 and positions the flip-flop BR at "0." The "normal" output of the flip-flop BR is connected on the one hand to the control input of a circuit 776 and on the other hand to one of two inputs of an "AND" circuit 789, while the "complementary" output of this flip-flop is connected to one of two inputs of an "AND" circuit 788. When the flip-flop BR is positioned at "1," its "normal" output is brought to a positive potential, whereby the circuit 776 is rendered conductive. In this case, a pulse emanating from the control unit and applied to the pulse input of this circuit 776 is transmitted to the adder-subtractor, thus indicating that the flip-flop BR is positioned at "1" or, what amounts to the same thing, that a carry is stored in this flip-flop.

The adding operation of the adder-subtractor 722 is brought about by a pulse sent by the control unit 730 to the said adder-subtractor through a conductor IA, while its subtracting operation is brought about by a pulse which is sent thereto by the said unit 730 through a conductor IS. A mixer circuit M2, whose inputs are connected to the conductors IA and IS, also makes it possible to transmit either one of these pulses to the mixer circuit M1 in order to ensure the return to zero of the flip-flop BR, and to the "normal" input of a flip-flop BI which is then positioned at "1."

The principle of the operation of the adder-subtractor may be simply described in the following manner. When two multi-digit numbers contained in the store 711 are to be added to one another (or subtracted one from the other), a pulse is previously sent to the adder-subtractor, either through the conductor IA or through the conductor IS in order to condition its operation, either as an adder or as a subtractor, depending upon the operation to be performed. In addition, this pulse, which is successively transmitted by the mixers M2 and M1, positions the flip-flop BR at "0." Thereafter, the digits of the units of the two numbers are simultaneously sent to the adder-subtractor after extraction from the store. The partial "units" result is then transmitted to the intermediate register and thereafter recorded in this store, while any carry is stored in the flip-flop BR. In an identical manner, the "tens" digits of the two numbers are extracted from the store and sent to the adder-subtractor. Simultaneously, the carry previously stored is transmitted to the adder-subtractor which, in turn, produces another partial "tens" result and another carry, if any, which are dealt with in a similar manner, and so on.

The adder-subtractor is also employed to perform the comparison of two numbers A and B comprising each a variable number of digits. In this case, a pulse is previously sent to the adder-subtractor through the conductor IS in order to condition its operation as a subtractor and thus to enable the subtraction $A-B$ to be effected. This pulse is transmitted also through the mixers M2 and M1, whereby the flip-flop BI is positioned at "1," while the flip-flop BR is returned to zero. The previous positioning of these flip-flops is performed before the said subtraction is commenced. Thereafter, the "units" digits of the numbers A and B are simultaneously sent to the adder-subtractor. A first partial result, supplied by the adder-subtractor, is then transmitted to the intermediate register, whereafter a pulse is sent by the generator 730 simultaneously to the circuits 777, 778 and 779. This pulse is transmitted on the one hand through one of the circuits 777 and 778 in order to position the flip-flop BR in a state depending upon whether a carry has or has not been produced. On the other hand, if the partial result then contained in the intermediate register is different from zero, this pulse is transmitted by the circuit 779 because, for the reasons previously indicated, this circuit is then rendered conductive. Consequently, the flip-flop BI changes to the state "0" and its "complementary" output, connected to the other inputs of the "AND" circuits 788 and 789, is then brought to a positive potential. It is to be understood that if the aforesaid partial result is equal to zero, the pulse is blocked by the circuit 779 and consequently the flip-flop BI remains in the state "1." The "tens" digits of the numbers A and B are thereafter simultaneously sent to the adder-subtractor, which then supplies a second partial result which is transmitted to the intermediate register. A further pulse, sent to the circuits 777, 778 and 779, enables the flip-flops BR and BI to be positioned. In a similar manner, the "hundreds" digits of the numbers A and B are transmitted to the adder-subtractor, then the "thousands" digits, and so on.

When the last partial result has been transmitted to the intermediate register and the flip-flops BR and BI have finally been positioned, the comparison of the numbers A and B is complete and the result of this comparison is indicated by the state of the "normal" output of the flip-flop BI and of the outputs of the "AND" circuits 788 and 789. If, at the end of the comparison, the flip-flop BI has remained in the state "1," this means that all the partial results obtained were equal to zero, and therefore that the two numbers A and B are equal. In this case, a positive voltage is set up at the "normal" output of the flip-flop BI, while no positive voltage appears at the outputs of the "AND" circuits 788 and 789. If, on the other hand, the flip-flop BI is in the state "0" at the end of the comparison, this means that, since at least one of the partial results is different from zero, the numbers are different. In this case, if the last carry which has been recorded in the register BR is zero, this means that A is greater than B. Under these conditions, the "complementary" outputs of the flip-flops BI and BR are brought to a positive potential and consequently a positive voltage is set up only at the output of the "AND" circuit 788. On the other hand, if the last carry which has been recorded in the register BR is equal to 1, this means that A is smaller than B.

Under these conditions, the "normal" output of the flip-flop BR and the "complementary" output of the flip-flop BI are brought to a positive potential, and consequently a positive voltage is set up only at the output of the "AND" circuit 789.

It will be noted from FIGURE 1B that a control circuit 780 is connected by its control input to the output of an "OR" circuit 786. This "OR" circuit possesses four inputs, each being connected to the output of one of four "AND" circuits 790, 791, 792 and 793 respectively. Each of these four "AND" circuits has two inputs. FIGURE 1B shows that the "AND" circuit 790 is connected by one of its inputs to the output of the "AND" circuit 788, and by the other input to the output marked $>$ of the decoder 772. The "AND" circuit 791 is connected by one of its inputs to the output of the "AND" circuit 789, and by the other input to the output marked $<$ of the decoder 772. The "AND" circuit 792 is connected by one of its inputs to the "normal" output of the flip-flop BI and by the other input to the output marked $=$ of the decoder 772. Finally, the "AND" circuit 793 is connected by one of its inputs to the output marked $\neq$ of the decoder 772, and by the other input to the output of an "OR" circuit 785. This "OR" circuit 785 has two inputs, one being connected to the output of the "AND" circuit 788 and the other being connected to the output of the "AND" circuit 789, and it has at its output a positive voltage each time one or other of the outputs of the "AND" circuits 788 and 789 is brought to a positive potential. Likewise, each time any one of the outputs of the "AND" circuits 790 to 793 is brought to a positive potential, the output of the "OR" circuit 786 is brought to a positive voltage, whereby the control circuit 780 is rendered conductive. In the following, there will be considered the conditions under one of the outputs of the "AND" circuits 790 to 793 is brought to a positive potential. The control circuit 780 is connected by its pulse input and through a conductor IV to the control unit 730 in order to receive a pulse to be transmitted. As will hereinafter be explained, this pulse is sent to the said circuit 780 only in the case of the performance of operations defined by particular instructions called "variants." The said pulse may then be transmitted by the said circuit 780 and sent to a mixer circuit M3 which transmits it in turn to a gate 752. In addition, the mixer circuit M3 is connected to the control unit 730 through a conductor IG in order to be able to receive a pulse and to transmit it to the gate 752, in cases where it is unnecessary to control the transmission of this pulse by the circuit 780.

FIGURES 1A, 1B and 1C further show that the intermediate register 716 and the auxiliary register 701 are connected to a first address register 704 called a programme address register, to a second address register 703 and to a third address register 702. Each of these address registers has a capacity of two characters, which is indicated in FIGURE 1C by a centre chain line separating each register into two parts. FIGURES 1A, 1B and 1C show that the left-hand part or first stage of the address register 702 can receive a character transmitted from the intermediate register 716 through a gate 733, while the right-hand part or second stage of this address register can receive a character transmitted from the auxiliary register 701 through a gate 734. Similarly, the address register 703 can receive, in its left-hand part, a character emanating from the intermediate register through a gate 735, and in its right-hand part a character emanating from the auxiliary register through a gate 736. Finally, the address register of the programme 704 can receive in its left-hand part a character emanating from the intermediate register through a gate 737, and in its right-hand part a character emanating from the auxiliary register through a gate 738.

It will be assumed by way of example that each of the address registers 702, 703 and 704 consists of two groups of six flip-flops, each group constituting one of the stages of each of these registers, each flip-flop of the first group being able to be connected by its two inputs to the two outputs of a corresponding flip-flop of the intermediate register, each flip-flop of the second group being able to be connected by its two inputs to the two outputs of a corresponding flip-flop of the auxiliary register. Consequently, each part of these address registers may be connected to the intermediate register or to the auxiliary register by means of twelve conductors. Therefore, each of the gates 733 and 738 consists of twelve control circuits. It is to be noted that this mode of connection makes it unnecessary for any one of these address registers to be returned to zero before there is transferred thereto a character emanating from the intermediate register or from the auxiliary register, since, in the transfers, each of the flip-flops of the address register under consideration always receives a positive pulse, either on its "normal" input or on its "complementary" input.

Each of the address registers 702, 703, 704 is able to be connected to the selection register 714 through gates 752, 753, 754 respectively. FIGURE 1A shows that the capacity of the selection register 714 is two characters. The connections are so established that the left-hand part or first stage of the said register 714 can receive one of the characters initially contained in the left-hand part of one of the registers 702, 703, 704, and that its right-hand part or second stage can receive one of the characters initially contained in the right-hand part of the said registers 702, 703, 704. The construction of the register 714 is similar to that of the registers 702 to 704. It will be assumed that this register consists of twelve flip-flops and that each flip-flop is connected by its two inputs to a corresponding flip-flop of each of the registers 702 to 704. Consequently, each of the registers 702 to 704 is connected to the register 714 through twenty-four conductors. Therefore, each of the gates 752, 753 and 754 consists of twenty-four control circuits.

The right-hand port of the register 714 can receive in particular cases which will hereinafter be examined a binary combination which represents a constant datum, the said constant then emanating from a register 705 called the constant register. The register 705 is intended to contain a number of constants, but it will be assumed for the moment that the number of constants is limited to two. In this case, the register 705 consists of two parts, as indicated in FIGURE 1A, and each part of the register contains a constant. Either one of these constants may be transmitted to the right-hand part of the register 714 through one of two gates 755 and 756. It is to be noted that the transfer of a constant from the register 705 to the register 714 is not accompanied by any change in the state of the register 705 and that consequently the constant which has been transmitted is not erased from this register. It is also to be noted that the construction of the register 705 is of no particular importance and that this register may be designed in various forms employing known techniques. In addition, the construction of the gates 755 and 756 is identical to that of the gates 733 to 738 and for this reason will not be described. The characters contained in the selection register 714 constitute an address by means of which a particular location can be selected in the store. For this purpose, the character initially contained in the left-hand part of the register 714 is decoded by the decoder S of the selection control member 712 in order to determine an abscissa $x$, while simultaneously, the character contained in the right-hand part of the register 714 is decoded by the decoder T of the selection control member 713 for determining an ordinate $y$. The location of the store which is then selected is that which is determined by the intersection of the said abscissa with the said ordinate.

The connections between the register 714 and the members 712 and 713 are effected by means of twelve conductors. Six of these conductors each connect "normal" outputs of the flip-flops constituting the left-hand part of the register 714 to each of the six inputs A1 to A6 of the decoder S (shown in FIGURE 2).

For reasons of simplicity, these six conductors have been represented by a single conductor in FIGURE 1A. Similarly, six conductor wires, represented by a single conductor in FIGURE 1A, connect the right-hand part of the register 714 to the decoder T of the member 713.

The address contained in the selection register 714 may be utilised by the selection control members 712 and 713 to select a location from the store. In addition, it may be transmitted through a gate 760 to an address advancer 706 which changes it for the purpose of selecting another location from the store. In this case, the address which has been changed is transmitted from the address advancer 706 to one of the address registers 702, 703, 704 through gates 762, 763, 764, respectively, and from there it may be retransmitted to the register 714 through the gates 752, 753, 754 respectively.

Figure 5:
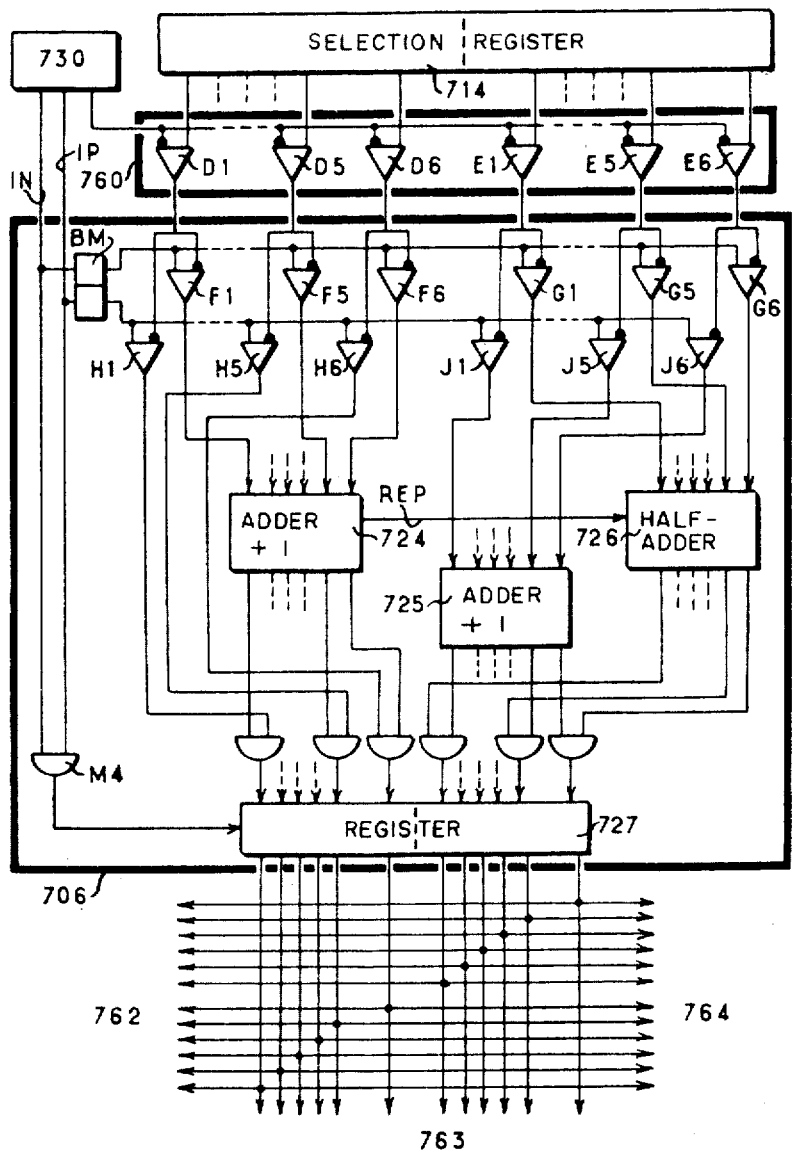
FIGURE 5 illustrates the construction of an address advancing or incrementing member employed in the machine illustrated in FIGURES 1A, 1B and 1C.

The construction of the address advancer 706 will now be described with reference to FIGURE 5. One of the two characters of the address to be changed is recorded in six flip-flops which constitute the left-hand part of the register 714, while the other character is recorded in the six flip-flops constituting the right-hand part of this register. The register 714 is connected to the address advancer 706 through the gate 760. This gate consists of twelve control circuits D1 to D6 and E1 to E6, of which only six have been shown in FIGURE 5 for the sake of simplicity. The control inputs of the circuits D1 to D6 are connected to the "normal" outputs of the flip-flops constituting the left-hand part of the register 714, while those of the circuits E1 to E6 are connected to the "normal" outputs of the flip-flops constituting the right-hand part of this register. The pulse inputs of the circuits D1 to D6 and E1 to E6 simultaneously receive a pulse to be transmitted and supplied by the control unit 730. Each of these circuits is rendered conductive or not, depending upon whether the flip-flop of the register 714 which is connected thereto is in the state "1" or in the state "0." The aforesaid pulse is transmitted only by the circuits which have thus been rendered conductive. FIGURE 5 shows a first group of control circuits F1 to F6 and G1 to G6, only some of which are illustrated and which are connected by their pulse input to the outputs of the circuits D1 to D6 and E1 to E6 respectively. The circuits F1 to F6 and G1 to G6 are connected by their control input to the "normal" output of a flip-flop BM. FIGURE 5 shows a second group of control circuits H1 to H6 and J1 to J6, only some of which have been illustrated and which are connected by their pulse input to the outputs of the circuits D1 to D6 and E1 to E6 respectively. The circuits H1 to H6 and J1 to J6 are connected by their control input to the "complementary" output of the flip-flop BM. The positioning of the flip-flop BM is effected by means of pulses sent by the control unit 730 through two conductors IN and IP, IN being connected to the "normal" input of the flip-flop BM, and IP being connected to the "complementary" input of the said flop-flop. Thus, when a pulse is sent by the control unit 730 through the conductor IN, the flip-flop BM is positioned in the state "1," whereby the circuits F1 to F6 and G1 to G6 are rendered conductive, while when a pulse is sent by the said unit 730 through the conductor IP, the flip-flop BM is positioned in the state "0," whereby the circuits H1 to H6 and J1 to J6 are rendered conductive.

In the case where the flip-flop BM is in the state "1," the pulses transmitted by the circuits D1 to D6 are blocked by the circuits H1 to H6 and transmitted by the circuits F1 to F6 to a "+1" adder 724, while the pulses transmitted by the circuits E1 to E6 are blocked by the circuits J1 to J6 and transmitted by the circuits G1 to G6 to a half-adder 726. The adder 724, called the "plus one" adder, is essentially a translator capable of supplying groups of signals represented by pulses, the binary structure of which represents the binary structure of the input pulses, to which the binary value 1 has been added.

FIGURE 5 shows a register 727 in two parts, which will be assumed to consist of twelve flip-flops, and the left-hand part of which is connected to the "+1" adder 724 to receive the pulses supplied by this adder. Thus, the left-hand part of the register 727 receives a combination of six binary digits formed by adding 1 to the combination of six binary digits contained in the left-hand part of the register 714, this change being effected by the "+1" adder 724. Thus, the combination 000111, for example, is changed to 001000. However, if the combination to be changed is 111111, this combination is changed to 000000 by the adder 724 and gives rise to a carry. This carry is then transmitted to the half-adder 726 through a conductor REP. The half-adder 726 has the object of adding this carry to the binary combination which reaches it in the form of pulses sent by the circuits G1 to G6. The right-hand part of the register 727 is connected to the half-adder 726 to receive the binary combination transmitted by the latter with or without changes, depending upon whether a carry has been transmitted to the said half-adder. Finally, when the flip-flop BM is in the state "1," the address 111111, 000111, for example, of which the $x$ address part 63 is contained in the left-hand part of the register 714 and of which the $y$ address part 7 is contained in the right-hand part, is changed to 000000 001000, the $x$ address part 0 being held in the left-hand part of the register 727 and the $y$ address part 8 being held in the right-hand part.

On the other hand, in the case where the flip-flop BM is in the state "0," the pulse transmitted by the circuits D1 to D6 are blocked by the circuits F1 to F6 and transmitted by the circuits H1 to H6 to the flip-flops constituting the left-hand part of the register 727, while the pulses transmitted by the circuits E1 to E6 are blocked by the circuits G1 to G6 and transmitted by the circuits J1 to J6 to another "+1" adder 725, the construction of which is similar to that of the adder 724. The function of the adder 725 is to add the value 1 to the binary combination which is transmitted thereto by the circuits J1 to J6. The right-hand part of the rigster 727 is connected to the said adder to receive the said binary combination thus changed. Thus, when the flip-flop BM is in the state "0," the address 111111 000010, for example, contained in the register 714 is changed to 111111 000011 in the register 727.

FIGURE 5 shows that the conductors IN and IP are connected to a mixer circuit M4, the function of which is to transmit to the register 727 any pulse sent by the control unit 730 through either one of the conductors IN and IP. The pulse transmitted by the circuit M4 produces the return-to zero of the register 727.

It will be noted that the gates 762, 763, 764 represented in FIGURE 1C each consist of twenty-four control circuits. Consequently, the connections between the registers 727 of the advancer 706 and each of the address registers 702 to 704 are effected by means of twenty-four conductors, each flip-flop of the register 727 being connected by its two outputs to the two inputs of a corresponding flip-flop in one of the registers 702 to 704. For the sake of the clarity of the diagram, FIGURE 5 shows only twelve of these conductors, each conductor being divided into three branches in accordance with its purpose (762, 763 or 764). This mode of connection renders unnecessary the return-to-zero of the registers 702 to 704 before the address changed by the advancer 706 is recorded therein.

The pulses which arrive at the various gates illustrated in FIGURES 1A, 1B and 1C emanate from the control unit 730. The order in which these pulses are sent to the gates depends upon the operations to be performed. It will be assumed that the control unit 730, which may be constructed in various ways using known means, consists, for example, of chains of sequentially progressing bistable elements, each chain advancing step-by-step under the control of its own elements and of advancing pulses supplied by a pulse generator, and supplying at various outputs pulses which are successively transmitted by each of these elements in order to initiate a number of elemental operations which proceed in accordance with a predetermined order. One of these chains is selected by the decoder-selector 721 when the latter has decoded the character which is transmitted thereto, in coded form, through the gate 741. It will be assumed that the decoder-selector 721 consists, for example, of a decoding pyramid of known type which, on receiving a combination of binary signals representing the transmitted character, supplies an indication intended to select a chain from the control unit for preforming an operation defined by this character. Said control unit 730 may be constructed on the same lines as that one described with reference to FIG. 3 of U.S. Patent No. 3,153,225 issued Oct. 13, 1964.

As has previously been stated, the system just described makes it possible for an index number contained in an instruction extracted from the store to control the selection and extraction of a corresponding developed address stored in the store, the said developed address in turn making it possible to control the selection and extraction of a quantity or operand to be processed, which is itself contained in the store. This means that, for a system designed in accordance with the invention, the data stored in the store are of three different categories these categories consisting of instructions, developed addresses and quantities to be processed, respectively. For a particularly advantageous application of this system to the administrative problems of small and medium concerns, it will be assumed that it is sufficient to have available indexes each consisting of one character. Consequently, it is possible to employ very short programme instructions each consisting of three characters. The first character of each instruction serves to define the type of operation which the machine is to perform: addition, subtraction, comparison, transfer, erasure, etc. This operation-indicating characters, sometimes called the function letter or function indication, will here be designated the T.O. (type-of-operation) character. The second character of each instruction represents an index by means of which it is possible to designate in the manner previously indicated a datum which is to be introduced into the operation defined by the T.O. character. The third character of each instruction generally represents another index by means of which another datum which is to be introduced in the course of this same operation can be designated in the same manner.

Since each index consists of one character represented in coded form by a combination of six binary digits, there are then avaliable 64 different indexes, corresponding to the 64 columns of the store 711.

The adoption of a store in which the selection of the locations takes place by the choice of coordinates $x$ and $y$, where $x$ may take the integral values comprised between 0 and 63, and $y$ may take the integral values comprised between 0 and 15, leads to the use of developed addresses, each of which consists of two characters, each character being represented by a combination of six binary digits. As an example, a number of 64 developed addresses has been adopted.

The aforesaid 64 developed addresses then make it possible to select 64 different zones in the store. It will here be assumed that each zone contains one word, that each word constitutes a quantity to be processed which may comprise a variable number of characters, and that the zones are sperated from one another by flag characters. In this case, the selection of a word is effected from a developed address which specifies the location of the flag character situate at the beginning of the zone containing this word, the characters of the word thereafter being successively selected from addresses obtained successively by incrementing the said developed address.

The addressing mode just described may also be applied for selecting instructions contained in the store.

It is known that a programme is formed by a series of instructions and that the succession of the operations by which a processing function can be performed is defined by a series of instructions called a sequence. Since the programme may thus be regarded as consisting of an assembly of sequences, it follows that a sequence may be designated by simply designating the first of the instructions constituting the said sequence. More particularly, the previously described data storage and processing system according to the invention enables an index contained in an instruction extracted from the store to monitor the selection and extraction of a corresponding developed address contained in the store, the said developed address in turn permitting of designating the first of the instructions of a sequence.

Such an arrangement facilitates the writing of the branching operations, since it is sufficient to indicate the index of the beginning of the sequence to which it is desired to bring the programme. In addition, the possibilities of modifying the order of the sequences, or introducing or substituting new sequences, do not in any way affect the other sequences, which makes the programming very flexible.

There will now be explained the operation of the data storage and processing system which has been described and has been illustrated in FIGURES 1A, 1B and 1C, in its application to the selection of data with the aid of indexes. Two cases of utilization will now be explained. The first case concerns the selection of operands to be processed with the aid of indexes. The second case is generally concerned with the designation of the first character of an instruction from an index. It will be assumed that two series of developed addresses are stored in the store, each series comprising 64 developed addresses, and that each series is employed in one of the two aforesaid cases. It is to be noted here that among the instructions stored in the store one instruction has a particular function. It will be assumed that the change from one programme sequence to another is effected by means of particular instructions, sometimes called "branch" instructions or "shift" instructions and here called "variants." The indexes forming part of these "variants" serve to select developed addresses from the addresses of the second series, each of the developed addresses thus selected in turn serving to designate a particular programme instruction. The indexes which form part of the other instructions, on the other hand, serve to select developed addresses from the addresses of the first series, and these developed addresses thereafter serve for selecting quantities to be processed. The three categories of data (instructions, developed addresses and quantities to be processed) are previously introduced into the store in known manner from punched cards, tapes, documents or the like. Three parts of the store are then occupied by the data thus recorded, each part containing one of the three categories of data.

FIGURE 4 illustrates by way of example a mode of distribution of these data in a store having 1024 locations. Referring now to FIGURE 4 it will be noted that a first series of developed addresses has been stored in a first section of the store whose locations are defined by $x=0, 1, 2, \ldots, 63$ and $y=0, 1$. It will be noted that the first character of each of these developed addresses of the first series is recorded in one of the locations defined by $x=0, 1, 2, \ldots$, and $y=0$, the second character then being recorded in one of the locations defined by $x=0, 1, 2, \ldots, 63$ and $y=1$. In a second section whose locations are defined by $x=0, 1, 2, \ldots, 63$ and $y=2$ and 3, there has been stored the 64 characters of the developed addresses of the second series. The arrangement is such that the two characters of a developed address are contained in two locations corresponding to the same value of $x$. It will be recalled that each character stored in one of the locations of the store is represented by a coded combination of six binary digits. For reasons of convenience, there has been indicated in some locations of the store the decimal value corresponding to the binary combination which has been recorded in each of these locations, which value cannot exceed 63 because each combination comprises six binary digits. At the location defined by $x=6$, $y=3$, for example, the value 11 expresses the fact that the binary combination recorded in this location is 001011.

A third section of the store serves for recording instructions of the programme, each of these instructions having a fixed length of three characters. The adoption of instructions of fixed length then makes it possible to record these instructions in the store one after the other without their having to be separated, since the number of characters which constitutes each instruction is fixed and known. FIGURE 4 illustrates by way of example, in the row whose ordinate $y$ is 4, instructions + 4 5, T 5 11, C 5, 4, ..., of three characters each, of which the characters have thus been stored one after the other. It will be assumed that in FIGURE 4 the letter V constitutes the first character of the "variant" instructions.

A last section of the store serves for storing the quantities to be processed. It will be assumed that these quantities to be prossessed, which may be of numerical or alphabetical nature, here consist of numbers involved in computing operations. These numbers, which do not all possess the same number of digits, are separated from one another in the store of flag characters. In FIGURE 4, the locations containing flag characters have been symbolically market by crosses.

It will be noted that the capacity of the store illustrated in FIGURE 4 is 1024 characters, that the store 711 consequently comprises 1024 locations defined by the values of $x=0, 1, 2, \ldots, 63$ and by the values of $y=0, 1, 2, \ldots, 15$, but that, for obvious reasons of simplicity, only some of the locations of this store have been shown.

Two cases of utilisation of the data storage and processing system illustrated in FIGURES 1A, 1B and 1C will now be described, on the assumption that the data stored in the store 711 are distributed in the latter in accordance with the arrangement illustrated in FIGURE 4. In addition, it will be assumed that in the constant register 705 there have been stored a first constant of value equal to 0, and a second constant of value equal to 2, which first constant may be transmitted to the register 714 through the gate 755, while the second constant may be transmitted to the register 174 through the gate 756.

FIRST CASE: EXTRACTION OF QUANTITIES TO BE PROCESSED WITH THE AID OF INDEXES

In the initial state, it will be assumed that the intermediate register 716, the auxiliary register 701 and the address registers 702 and 703 are at zero, that is to say, contain no character. In the address register 704, called the programme address register, is situated the direct or real address of the first character of an instruction to be extracted from the store. In the example under consideration, it will be assumed that the address thus contained in the programme address register 704 is represented by the two binary combinations:

000101 000101

These combinations 000101, which each correspond to the decimal digit 5, are contained in the left-hand part and in the right-hand part of the register 704 respectively. A succession of operations by which three successive working phases can be defined is initiated by starting of the control unit 730. These phases, which will now be described with reference to FIGURES 1A, 1B, 1C and 4, relate, respectively, to the extraction of an instruction from the store, to the exraction of the developed addresses, corresponding to the indexes forming part of the said instruction, and to the extraction of quantities to be processed by means of the aforesaid developed addresses.

Extraction of an instruction

In a first working phase, a pulse sent to the gate 754 by the control unit 730 permits the transfer of the address contained in the programme address register 704 to the selection register 714. As a result of this transfer, each of the parts of the register 714 contains the combination 000101. The combination 000101 decoded by the decoder S of the selection control member 712 defines for the abscissa $x$ the value $x=5$, while the combination 000101 decoded by the decoder T of the selection control member 713 defines for the ordinate $y$ the value $y=5$, whereby it is possible to select from the store the character contained in the location defined by $x=5$ and $y=5$. FIGURE 4 shows that the character thus selected is the character C. A pulse is then sent by the control unit 730 to the selection control members 712 and 713 through the conductor CL, so that it is possible to extract the said character C from the store. The said character is then transmitted to the intermediate register 716 through the connection L. It will be recalled that this character C, which is the first character of an instruction, has been called the T.O. character, and that it serves to define the type of operation to be performed.

In the present case, the character C indicates that the operation to be performed is a comparing operation. A pulse, sent by the control unit 730 to the selection control members 712 and 713 through the conductor CE, enables the character C to be re-stored in the location of the store in which it was originally situated. This re-storage takes place without return-to-zero of the intermediate register 716. A pulse sent to the gate 741 by the control unit 730 then permits the transfer of the character C contained in the intermediate register 716 to the selector-decoder 721. As a result of this transfer, the selector-decoder selects a chain in the control unit for performing the aforesaid comparing operation.

The control unit then sends a pulse through the conductor CZI to the register 716 in order to return the latter to zero. A pulse is then sent to the address advancer 706 through the conductor IN to permit the modification of the character then contained in the first stage of the register 714. A pulse sent to the gate 760 through the control unit thereafter permits the transfer of the address contained in the register 714 to the address advancer 706. The said address is then modified in a manner previously indicated and becomes $x=6$ and $y=5$. A pulse sent to the gate 764 by the control unit then permits the transfer of the address thus modified to the programme address register 704. The said modified address is then transmitted from the register 704 to the register 714 by means of a pulse sent to the gate 754 by the control unit. The selection control members 712 and 713 then permit of defining from the address contained in the register 714 the value $x=6$ for the abscissa $x$ and the value $y=5$ for the ordinate $y$. FIGURE 4 shows that the character which is then selected is the index number 2. A pulse sent by the control unit to the selection control members 712 and 713 through the conductor CL permits of extracting this character 2 from the store, which character is then transmitted to the intermediate register 716. A pulse sent to the members 712 and 713 by the control unit through the conductor CE permits of re-writing this character in the store in its original location. A pulse sent to the gate 733 by the control unit thereafter permits the transfer of the index 2 contained in the intermediate register to the left-hand part of the address register 702. The intermediate register is thereafter returned to zero.

Similarly, the control unit successively sends pulses which enable the address contained in the register 714 to be transferred to the address advancer, in which it is changed to $x=7$ and $y=5$. Thereafter, the said changed address is successively transmitted to the programme address register 704 and then to the register 714. The said address permits of defining for the abscissa and the ordinate the values $x=7$ and $y=5$. By means of a pulse sent through the conductor CL by the control unit, the character which is situated in the store in the location defined by these values of $x$ and $y$ is then extracted from the store and stored in the intermediate register 716. FIGURE 4 shows that this character is the index number 9. This character is re-written in the store, and a pulse sent to the gate 735 by the control unit then permits the transfer of this index 9 contained in the intermediate register to the left-hand part of the address register 703. Thereafter, the intermediate register is returned to zero.

The address contained in the register 714 is thereafter transmitted to the address advancer 706, which changes it to 001000 000101 and, thus changed, it is finally transmitted to the programme address register 704.

The control unit is so designed that when the three-characters of the instruction have been extracted from the store, a further working phase is undertaken. In the course of this second phase, the indexes which have been extracted from the store will be used in turn to permit of extracting from the store the developed addresses corresponding to these indexes.

Extraction of the developed addresses

In the second working phase, a pulse sent to the gate 752 by the control unit 730 through the conductor IG and the mixer M3 permits the transfer of the first index 2 contained in the address register 702 to the left-hand part of the selection register 714. As a result of this transfer, the left-hand part of the register 714 contains the combination 000010 corresponding to the encoding of this first index, while the right-hand part of this register contains the combination 000000 emanating from the right-hand part of the register 702. Taking account of the progress of the present working phase and of the fact that the preceding instruction was not a "variant," the control unit 730, which is controlled by the selector-decoder 721 which has decoded the first character of the instruction, sends a pulse to the gate 755 so that, of the constants contained in the constant register 705, only the constant 0, represented by 000000, is transferred into the right-hand part or second stage of the register 714.

The two characters then contained in the register 714 constitute an address by means of which a value of $x$ equal to 2 and a value of $y$ equal to 0 can be defined. Owing to a pulse sent by the control unit through the condutcor CL, the character 9 which is stored in the store in the location defined by these values of $x$ and $y$ is then extracted from the store and introduced into the intermediate register. This character 9 is thereafter re-introduced into the store, while remaining held in the intermediate register. Since this character is not a "flag" character, the output D of the flag detector-decoder 708 is brought to a positive potential, while no positive voltage appears at the output D. Consequently, the circuit 773 is rendered conductive, while the circuits 774 and 775 are non-conductive. A pulse simultaneously sent to the circuits 773 and 774 by the control unit is transmitted only by the circuit 773 and reaches the gate 743, whereby the character 9 contained in the intermediate register is transferred to the auxiliary register 701. The intermediate register is thereafter returned to zero. A pulse is then sent to the address advancer 706 through the conductor IP in order to enable the character of the address which is situated in the right-hand part of the register 714 to be modified. A pulse sent to the gate 760 by the control unit then permits the transfer of the address contained in the register 714 to the address advancer 706. The said address is then modified in a manner previously indicated and becomes $x=2$ and $y=1$. A pulse then sent to the gate 762 by the control unit enables this modified address to be transferred into the address register 702. The despatch of a pulse to the gate 752 through the conductor IG and the mixer M3 then enables this address to be transferred to the register 714. The character 9 contained in the auxiliary register constitutes the second character (ordinate y) of a developed address. The address which is still contained in the register 714 will enable the second constituent character of this developed address to be extracted from the sore. The address contained in the register 714 enables a value of $x$ equal to 2 and a value of $q$ equal to 1 to be defined. By means of a pulse sent through the conductor CL by the control unit, the character 5, which is stored in the sore in the location defined by these values of $x$ and $y$ is extracted and introduced into the intermediate register. This character is thereafter re-recorded in the store, whereafter pulses simultaneously sent to the gates 733 and 734 by the control unit enable the characters 5 and 9 contained in the intermediate register and the auxiliary register respectively to be transferred to the register 702. As a result of these transfers, the characters 2 and 1 which were contained in the register 702 are erased and replaced by the characters 5 and 9 respectively. Pulses sent through the conductors CZI and CZA then effect the return-to-zero of the intermediate and auxiliary registers.

The address register 702 now contains two characters 5 and 9 which then constitute a first developed address. This developed address has been extracted from the store with the aid of the first index which was previously contained in the register 702. Similarly, in a third working phase, the second index which is contained in the address register 703 enables the developed address corresponding thereto to be extracted from the store, this address then entering the register 703 in place of the said second index. Examination of FIGURE 4 will show that this second developed address contained in the register 703 is $x=1$ and $y=10$.

*Extraction of the quantities to be processed*

The developed addresses contained in the address registers 702 and 703 each define the location of a "flag" character, this "flag" character being placed at the beginning of the quantity to be extracted from the store. Successive extraction of the characters constituting each of these quantities makes it necessary to increment, respectively, each of the said developed addresses. This incrementing consists, in the present case, in successively adding 1 to the first character constituting each of these developed addresses, so as to obtain successive addresses each defining the location of the first character of the quantities to be extracted. In practice, extraction of these quantities will be effected in further operating phases in the following manner.

A pulse sent to the gate 753 through the control unit permits the transfer of the developed address contained in the register 703 to the register 714. A pulse is thereafter sent to the address advancer 706 through the conductor IN in order that the first character of the address which will be sent thereto may be modified. A pulse thereafter sent to the gate 760 through the control unit permits the transfer of the address contained in the register 714 to the address advancer 706. This address is then modified and becomes $x=2$ and $y=10$. A pulse sent to the gate 763 by the control unit then enables this modified address to be transferred into the register 703.

Similarly, the developed address contained in the register 702 is successively transferred into the register 714 and then into the address advancer in which it is changed to $x=6$ and $y=9$. Thus changed, it is finally re-introduced into the register 702.

The address which is then contained in the register 703 is again transferred into the register 714 and then enables a value of $x$ equal to 2 and a value of $y$ equal to 10 to be defined. A pulse sent through the conductor CL enables the character 1, which was stored in the location defined by these values of $x$ and $y$, to be extracted from the store. This character 1 is then transmitted to the intermediate register and from there is re-recorded in the store, while remaining contained in the intermediate register. The circuit 773, which is rendered conductive owing to the fact that the output D of the "flag" detector-decoder is brought to a positive potential by reason of the absence of a "flag" in the register 716, transmits to the gate 743 a pulse which is supplied to it by the control unit, which produces the transfer to the auxiliary register of the character 1 contained in the intermediate register.

The intermediate register is thereafter returned to zero, while the address contained in the register 714 is transferred into the address advancer, which changes it to 000011 001010 and, thus modified, is transferred into the register 703.

Similarly, the address which is contained in the register 702 is transferred into the register 714 in order to enable the character 3 which is stored in the location defined by $x=6$, $y=9$ to be extracted from the store. A pulse is then sent to the circuit 775 by the control unit. Owing to the fact that this circuit is non-conductive, the said pulse is blocked and is not transmitted to the control unit. The non-transmission of this pulse indicates to the control unit that the character which is then contained in the intermediate register is not a "flag" character and therefore that the end of the characters constituting the operand A has not yet been detected.

The address contained in the register 714 is thereafter transmitted to the advancer 706, which changes it to $x=7$ and $y=9$, and is finally transmitted, thus changed, to the register 702.

It will be noted that the character 3 which has just been extracted from the store and which is now contained in the intermediate register represents the "units" digit of a number A whose component digits 3, 4, 1, 4 are stored in the store locations defined by $x=6$, 7, 8, 9 and $y=9$. Likewise, the character 1 which is contained in the auxiliary register representing the "units" digit of a number B whose component digits 1, 4, 2 are stored in the store locations defined by $x=2$, 3, 4 and $y=10$. It will be noted that, in order to facilitate the operations, these numbers have been stored during the charging of the store, in the opposite order to that in which they are normally written. Thus, the number A, for example, is in fact 4143.

Since the character T.O. which has been transmitted to the selector-decoder 721 has defined that the operation to be performed was a comparison of the numbers A and B, a pulse is then sent to the adder-subtractor 722 through the conductor IS, so as to cause it to operate as a subtractor. It will be recalled that in this case the adder-subtractor is designed to deduct from the A digit initially contained in the intermediate register the B digit initially contained in the auxiliary register.

Pulses simultaneously sent to the gates 739, 740 and 776 bring about the transfer to the adder-subtractor of the digit 3 contained in the intermediate register and of the digit 1 contained in the auxiliary register, while no carry is transmitted to the said adder-subtractor owing to the fact that the flip-flop BR is at zero. Without further entering into the details of the operations which have been described, it will simply be indicated that the first partial result is 2 and that the first carry produced is zero. This first partial result is first transmitted to the intermediate register in place of the digit 3, whereafter a pulse simultaneously applied to the gates 777, 778 and 779 produces the positioning at "0" of the flip-flops BR and BI. It will be recalled that, since the first partial result contained in the intermediate register is different from zero, the circuit 779 is rendered conductive owing to the fact that the output of the indicator 709 is brought to a positive potential.

In the case where a comparison is performed, the partial result is not to be stored in the store. The intermediate and auxiliary registers are then returned to zero in order to enable them to receive the "tens" digits of the numbers A and B. Operations similar to those just described then permit of sending these digits, both equal to 4 in the example under consideration, to the adder-subtractor, and also permit of incrementing the X parts of the addresses. The second partial result obtained is then 0 and the second carry obtained is zero. A pulse sent to the gates 777, 778 and 779 simultaneously continues to position at "0" the flip-flops BR and BI. The intermediate and auxiliary registers are thereafter returned to zero, and the "hundreds" digits of the numbers A and B consisting of the digits 1 and 2 respectively are then sent to the adder-subtractor. The third partial result obtained is 9, while a carry 1 appears. A pulse simultaneously sent to the gates 777, 778 and 779 positions the flip-flop BR at "1," while the flip-flop BI remains at zero. The intermediate and auxiliary registers are thereafter returned to zero, and the "thousands" digits of the numbers A and B are then extracted from the store. It will be noted that this digit then does not exist for the number B, since the latter comprises only three digits, and that a "flag" character is present in its place in the store. This "flag" character, stored in the location defined by $x=5$ and $y=10$, is extracted from the store and then contained in the intermediate register. However, in this case, only the output D of the "flag" detector-decoder is brought to a positive potential, whereby the circuits 774 and 775 are rendered conductive. A pulse simultaneously sent to the gates 773 and 774 by the control unit is then blocked by the circuit 773 and transmitted only by the circuit 774. The said pulse is then sent to the control unit and thus indicates that all the characters constituting the operand B have been dealt with. Since no character has been transmitted to the auxiliary register, the latter remains at zero. It will be indicated that the "flag" character contained in the intermediate register is re-recorded in the store, that the said register is thereafter returned to zero and that the digit 4 ("thousands" digit) of the operand A is finally extracted from the store.

The digits 4 and 0 then contained in the intermediate and auxiliary registers respectively are sent to the adder-subtractor at the same time as the carry previously stored in in the flip-flop BR. This produces a fourth partial result 3, while the carry obtained is zero. This partial result is transmitted to the intermediate register in place of the digit 4, whereafter a pulse simultaneously applied to the gates 777, 778 and 779 positions the flip-flop BR at "0," the flip-flop BI remaining at zero.

The control unit, which is now notified that all the characters constituting the operand B have been processed, continues the extraction of the characters constituting the operand A. It will be noted that, in the example under consideration, the character which must now be extracted is a "flag" character stored in the store location defined by $x=10$ and $y=9$. This character is then extracted from the store and contained in the intermediate register. A pulse is then sent to the circuit 775 by the control unit. Since this circuit is now rendered conductive, the said pulse is transmitted and sent to the control unit, thus informing it that all the characters constituting the operand A have been processed. The control unit, notified that the two operands A and B have been processed, can now bring about the extraction of the next instruction. Before the operations concerned in the extraction and processing of this instruction are described, it is desirable to point out that, as a result of the comparison of the operands A and B which has just been performed, the two flip-flops BR and BI have been finally positioned in the state "0" and that, consequently, only the output of the "AND" circuit 788 is brought to a positive potential. As has already been pointed out in the foregoing, this indication expresses the fact that A is larger than B. It should now be noted that the register 714 contains the address $x=10$ and $y=9$ and that the programme address register 704 contains the address $x=8$ and $y=7$. Before the extraction of the next instruction is brought about, the control unit returns to zero the intermediate and auxiliary registers. The return-to-zero of the registers 702 and 703 is thereafter effected by simply transferring thereto the digits "0" then contained in the said intermediate and auxiliary registers.

SECOND CASE: DESIGNATION OF A PROGRAMME INSTRUCTION WITH THE AID OF AN INDEX

The next instruction which is now to be extracted from the store consists, as shown in FIGURE 4, of the three characters V, O and >. As has already been indicated in the foregoing, the first character V shows that this instruction is a "variant" by means of which the programme can be branched to a predetermined instruction. This branching, also, called a "jump" in the computor art, however, takes place only if a certain condition concerning a result such as the result of a comparison, for example, is fulfilled.

The third character of this instruction indicates the condition which must be satisfied by this result in order that this setting may be effected. The second character of this invention is an index serving to define, in the second section of the store, the location storing the instruction at which the programme must be set when the aforesaid condition is satisfied. Thus, in the present case, the character > indicates that, in order that the setting may be performed, the result of the comparison of two operands A and B must express the fact that A is larger than B. The character 0 is the index which defines the setting instruction when this condition is satisfied. If it is not satisfied, the programme is continued by the instruction which succeeds the aforesaid "variant."

This "variant" instruction is extracted from the store 711 by a procedure similar to that already indicated. Without entering into any details, it will be recalled that the address $x=8$ and $y=5$ contained in the programme address register 704 is transferred to the register 714 in order to permit of selecting from the store the character TO of the instruction contained in the location defined by $x=8$ and $y=5$. This character, which is the character V, as shown in FIGURE 4, is extracted from the store, contained in the intermediate register 716 and then transferred from there to the selector-decoder 721. This character indicates that the operation to be performed is now a conditional branch operation. The selector-decoder then selects a chain from the control unit in order that this operation may be performed. The address which is contained in the register 714 is then transferred into the address advancer, in which it is changed to $x=9$ and $y=5$ and then, thus modified, is transmitted into the programme address register 704, and from there is transmitted to the register 714. It then permits the selection from the store of the second character of the instruction which is contained in the location defined by $x=9$ and $y=5$. This character, which is the character 0, as shown in FIGURE 4, is extracted from the store, contained in the intermediate register 716 and then transferred from there to the lefthand part of the address register 702. This character 0 is an index by means of which, as will hereinafter be seen, a programme setting instruction can be designated if a certain condition concerning the result of a comparison is satisfied.

The address contained in the register 714 is then transferred into the address advancer, in which it is modified to $x=10$ and $y=5$. It is then transmitted, thus modified, into the programme address register 704, and from there to the register 714. It permits the selection from the store of the third character of the instruction which is contained in the location defined by $x=10$ and $y=5$. This character, which is the character >, as is shown by FIGURE 4, is extracted from the store, and then contained in the intermediate register 716. This character indicates that, in order that the setting may be performed, the result of the comparison which has previously been made on two operands A and B must express the fact that A is greater than B. It is useful to recall here that these two operands have previously been compared and that a result expressing the fact that A is larger than B has been translated by the appearance of a positive voltage at the output of the "AND" circuit 788.

In the case where the character T.O. which has been transmitted to the selector-decoder 721 indicates that the operation to be performed is a conditional branch operation, the control unit 730 does not bring about the transfer to the register 703 of the third character of the instruction, which thus remains stored in the intermediate register 716. The return-to-zero of this register is then delayed.

The address contained in the register 714 is thereafter transferred into the address advancer 706, in which it is modified to $x=11$ and $y=5$ and then, thus, modified, is finally transmitted to the programme address register 704.

Since the three characters of the instruction have now been extracted from the store, a further working phase is undertaken in order to determine whether the conditions required for producing the "branching" have been satisfied and in order to extract from the store, if these conditions have been satisfied, the developed address which corresponds to the index which is stored in the first stage of the register 702.

Owing to the fact that the intermediate register contains the character >, the decoder 772 decodes this character, the effect of which is that the output marked ">" of the said decoder is brought to a positive voltage. Since the output of the "AND" circuit 788 is also brought to a positive voltage, it follows that a positive potential appears at the output of the "AND" circuit 790. A positive potential then appears at the output of the "OR" circuit 786, whereby the control circuit 780 is rendered conductive. Owing to the fact that the instruction which has been extracted is a "variant," the control unit 730, which is under the control of the selector-decoder 721, sends a pulse to the control circuit 780 through the conductor IV. This pulse is transmitted by the said circuit, which has been rendered conductive, and is sent on the one hand to the control unit, thus notifying it that the "branch" conditions are satisfied, and on the other hand to the mixer circuit M3, which transmits it in turn to the gate 752. This gate 752 then permits the transfer of the index 0 contained in the register 702 to the inputs of the first stage of the register 714. As a result of this transfer, the register 714 contains in each of its parts the combination 000000. The intermediate register 716 is thereafter returned to zero.

Since the operation to be performed is the processing of an instruction, the control unit sends a pulse to the gate 756 in order that, of the constants contained in the constant register 705, only the constant $y_k=2$, represented by 000010, may be transferred into the second stage of the register 714.

It is to be noted here that if the "branch" conditions were not satisfied, the pulse sent by the control unit to the circuit 780 would be blocked by the latter. Consequently, the control unit would not receive any pulse coming from 780. In this case, the control unit would successively bring about the return-to-zero of the intermediate register and then the return-to-zero of the register 702 by transferring to the said register the digit "0" then contained in the intermediate register.

In the present case, the register 714 contains two characters which constitute an address by means of which a value of $x$ equal to 0 and a value of $y$ equal to 2 can be defined. FIGURE 4 shows that the character which is thus selected and which is contained in the store location defined by $x=0$ and $y=2$ is the digit 4. This digit is then extracted from the store, contained in the intermediate register, from which it is re-introduced into the store on the one hand and transferred to the auxiliary register on the other hand. The intermediate register is thereafter returned to zero. A pulse is then sent to the address advancer 706 through the conductor IP, whereafter the address contained in the register 714 is transmitted to the said address advancer, in which it is changed to $x=0$ and $y=3$. Thus modified, it is then transmitted to the register 702 and from there returns to the register 714 and then permits the selection from the store of the character stored in the location defined by $x=0$ and $y=3$. This character, which is then character 0, as shown by FIGURE 4, is extracted from the store and contained in the intermediate register.

The character 0 is thereafter re-introduced in the store, while remaining stored in the intermediate register. The characters 0 and 4 stored in the intermediate and auxiliary registers respectively are thereafter simultaneously transferred into the register 702, in which they then constitute a developed address represented by $x=0$ and $y=4$. This developed address is the address of the first character of the instruction to which the programme is to be set. It will now readily be appreciated that this address may be transmitted to the register 714 in order thereafter to permit the extraction of the three characters of this instruction from the store, which instruction consists of the characters +4 5, as is shown in FIGURE 4. It will also readily be appreciated that if the "branch" conditions had not been satisfied, it would have been sufficient to transmit the address $x=11$ and $y=5$ contained in the register 704 to the register 714 in order to permit the programme to proceed. FIGURE 4 shows that the instruction which it would have been possible to extract in this case would have been that which follows the "variant" instruction previously extracted.

The characteristic points of the invention will be more clearly apparent from the following claims.

We claim:

1. A data processing system comprising in combination:

a three-dimensional matrix store 711 organized on a character basis, with storage locations defined each by an abscissa X and an ordinate Y in a rectangular system of M columns and N rows of locations, this store being functionally divided in a first section of two rows of M locations storing a series of direct addresses relative to operands, each address consisting in two numbers, a second section of two rows of M locations storing a series of direct addresses relative to instructions, each address consisting in two numbers, a third section of several rows of locations which store instructions, each always composed of a first character for an operation type, of a second character, named "index" which is an indirect address defining a column abscissa and of a third character which may be another "index" or a different indicating symbol, these instructions being stored in consecutive locations of increasing order, and a fourth section formed of the remaining rows which store words of A and B operands arranged in consecutive storage zones;

a selection register 714 composed of a first stage and a second stage for holding a character for the X part and a character for the Y part of an address respectively, this register being connected to said store for selecting one location thereof;

means for reading-out one character at a time from said store depending on an address held in said selection register;

an intermediate register 716 composed of one stage for holding one character, and connected for receiving each character thus read-out from said store;

a first address register 702 with two stages which can be operatively connected to said intermediate register, a constant register 705 which stores a first constant data $y_i$ and a second constant data $y_k$, and which can be operatively connected to the inputs of the second stage of said selection register, a control unit 730 having means made operative differently according to the type of operation performed and according to whether operands or instructions are processed and switching means activated under control of said control unit for rendering effective some determined connections selectively and sequentially, the arrangement being such that after an "index" has been transferred from said store into said first address register, said "index" is transferred into the first stage of said selection register, then said constant register transmits to the second stage of said selection register a determined constant data, thus constituting therein a direct address permitting to select a location in one of the first or second sections of said store.

2. A data processing system as claimed in claim 1, wherein two logical switching circuits 755, 756, associated to said constant register 705, are separately made operative under control of said control unit, such that the second stage of said selection register 714 receives said first constant $y_1$ or said second constant $y_k$ according to whether a direct address is to be read out from said first section or from said second section of said store.

3. A data processing system as claimed in claim 2, comprising:

a program address register 704 for holding an incremented direct address, an address advancer device 706 which normally can be operatively connected, under control of said control unit between said selection register 714 and said program address register 704 in order to increment by "1" the X part of a transferred address when operands are processed, said system further comprising;

further switching means IN, IP, 762 under control of said control unit for selecting inputs of said address advancer and for connecting the latter to said first address register 702 so as to transmit thereto an address whose Y part has been incremented by "1," when instructions are processed.

4. A data processing system as claimed in claim 3, wherein said address advancer 706 comprises a register 727 having a first stage and second stage for holding each a character, each of said stages being associated to a "+1" adder 724, 726, and a bistable flip-flop (BM) connected to set into operation either of said "+1" adders under control of said control unit.

References Cited
UNITED STATES PATENTS

| | | | |
|---|---|---|---|
| 3,036,773 | 5/1962 | Brown | 235—157 |
| 3,061,192 | 10/1962 | Terzian | 235—157 |
| 3,111,648 | 11/1963 | Marsh | 340—172.5 |
| 3,153,225 | 10/1964 | Merner | 340—172.5 |
| 3,222,649 | 12/1965 | King | 340—172.5 |

ROBERT C. BAILEY, *Primary Examiner.*

I. S. KAVRUKOV, *Assistant Examiner.*